June 27, 1967  F. A. SEEDHOUSE  3,328,109
STEREOMICROSCOPE WITH ARCUATELY ADJUSTABLE TUBE ASSEMBLY
Filed July 29, 1963   3 Sheets-Sheet 3
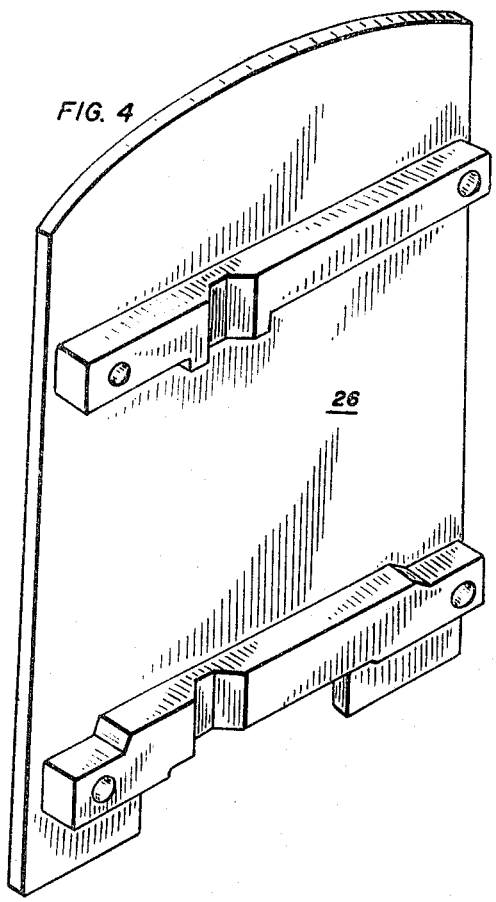
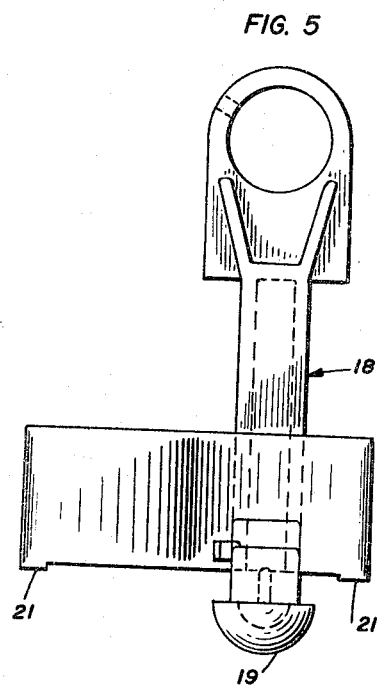
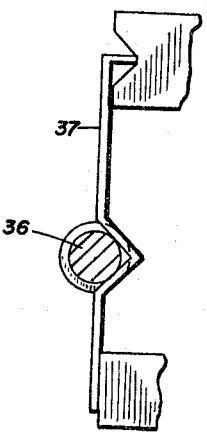
FREDERICK A. SEEDHOUSE
INVENTOR.
BY Frank C. Parker
ATTORNEY

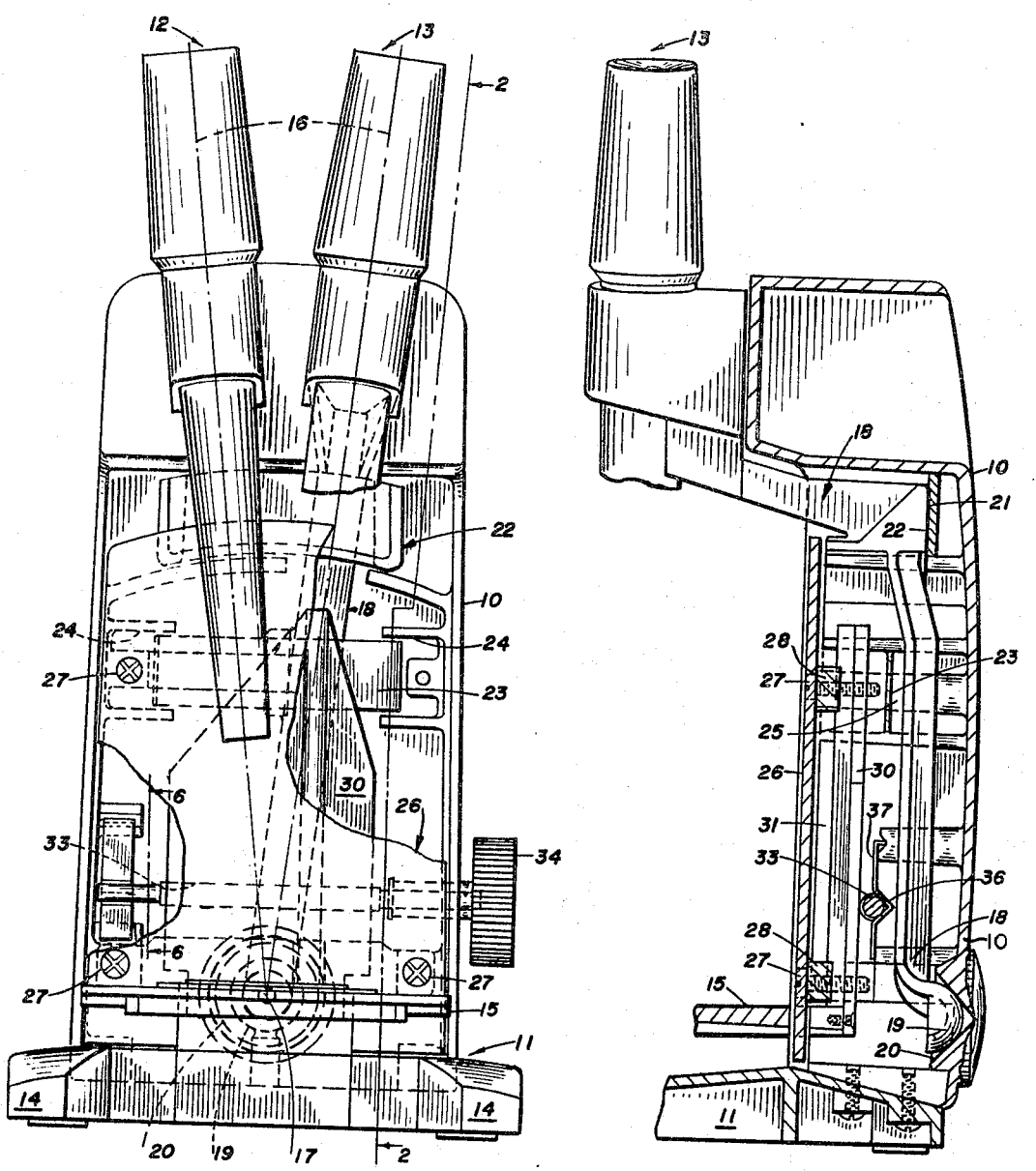

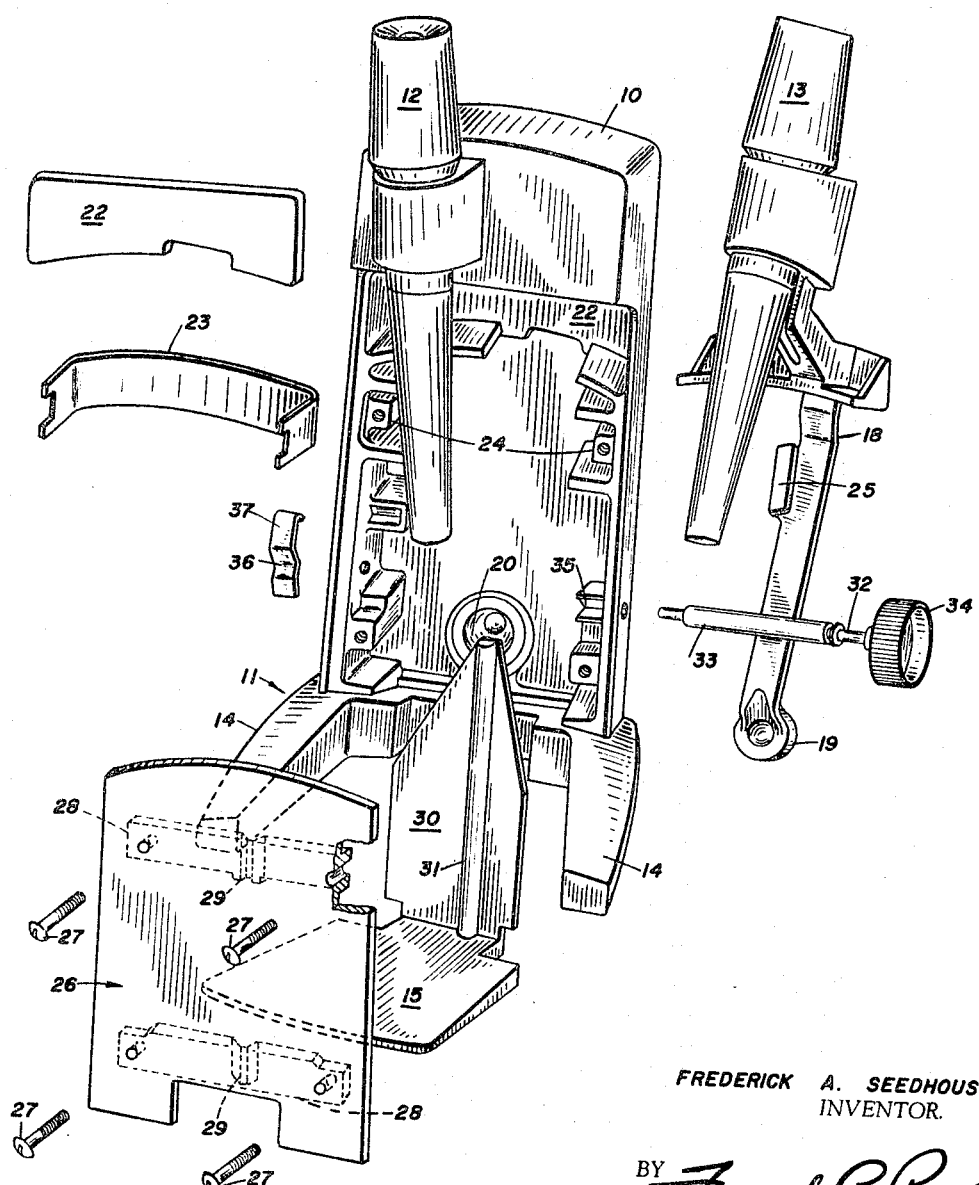

United States Patent Office 3,328,109
Patented June 27, 1967

3,328,109
STEREOMICROSCOPE WITH ARCUATELY
ADJUSTABLE TUBE ASSEMBLY
Frederick A. Seedhouse, Henrietta, N.Y., assignor to Bausch & Lomb, Incorporated, Rochester, N.Y., a corporation of New York
Filed July 29, 1963, Ser. No. 298,282
2 Claims. (Cl. 350—36)

This invention relates to microscopes and more particularly to stereomicroscopes.

The principal object of the present invention is to provide a stereomicroscope of simple and economical construction which lends itself well to mass production techniques.

A more detailed object of the present invention is to provide a stereomicroscope comprising a pair of viewing tube assemblies respectively stationarily and movably mounted in the microscope stand. Both of said viewing tubes have their optical axes disposed in a common plane including a point on a specimen at which both viewing tubes are directed.

Further, the movable viewing tube is preferably carried by a support which together with the microscope stand defines a ball and socket pivot joint for enabling pivotal movement of the movable tube assembly, there being means on the support and stand together defining at least a pair of flat surfaces cooperable with each other to guide the movable support and associated viewing tube on the pivotal movement thereof.

Other objects and advantages of the present invention will become more apparent when read in conjunction with the accompanying drawings, wherein:

FIG. 1 is a front elevational view of the microscope comprising the subject matter of the present invention;

FIG. 2 is a sectional view taken substantially along the line 2—2 in FIG. 1 and looking in the direction of the arrows;

FIG. 3 is an exploded perspective view illustrating the different parts of the microscope in disassembled relation;

FIG. 4 is a perspective view of the front cover plate for the microscope;

FIG. 5 is a detail view of the support for the movable microscope tube assembly; and FIG. 6 is a detail view of the tension spring for the microscope stage.

Turning now to the drawings, wherein like reference numerals have been used in the different views to identify identical parts, the microscope includes in general a stand 10, a base 11, and a pair of microscope tube assemblies 12 and 13. The base 11 has two forwardly projecting feet 14 for providing suitable stability for the microscope and is secured to the stand 10 by any suitable means, such as bolts. The tube assembly 12 is fixedly mounted on the stand 10 whereas the tube assembly 13 is movably mounted in the stand 10.

The microscope also includes a stage mechanism 15 and the optical axes 16 of each tube assembly 12 and 13 are each focused on a common point 17 which may be a point on a specimen placed on the stage 15. The stage mechanism 15 is, of course, vertically adjustable by means to be described in order to facilitate focusing the two stereomicroscopes 12 and 13 on a specimen placed upon the stage 15.

The movable microscope tube assembly 13 is carried by a generally L-shaped support 18. The L-shaped support 18 is rigidly secured to the movable tube assembly 13 and is formed with a ball portion 19 adapted to seat within a socket 20 formed in the back portion of the stand 10. The L-shaped support 18 is formed with a pair of flat portions 21 adapted to engage a preferably non-metallic flat plate 22 secured on the inside surface of the stand 10. The flat portions 21 slide over the flat plate 22 and in so doing permit the support 18 to pivot about the ball 19 and socket 20 as a pivot, and during which pivotal movement the optical axis 16 of the movable microscope tube assembly 13 remains coplanar with the optical axis 16 of the stationary tube assembly 12. In order to retain the L-shaped support 18 with the ball 19 seated within socket 20 and with its flat surfaces 21 disposed against the flat surface 22, a flat spring 23 seated within a pair of slots 24 bears against a bearing surface 25 formed on the front of the L-shaped support 18. It will thus be apparent that the tube assembly 13 may be pivotally moved about the ball 19 and socket 20 as a pivot point in order to adjust the distance between the microscope eyepieces at the upper end thereof to correspond to the pupillary distance between the eyes of the microscope observer using the instrument.

The microscope stand includes a front cover 26 which is held in place by a plurality of screws 27 which thread into the microscope stand. The cover 26 is formed with a pair of block portions 28 each of which is formed with a slot or groove 29 therein. The upper block 28 retains the spring member 23 in place.

The stage 15 is provided with an upright back portion 30 having a forwardly projecting rib 31. The rib 31 is adapted to seat within the two slots 29 whereby the latter function to guide the vertical movement of the stage 15. The stage back portion 30 cooperates with a shaft 32 having a friction sleeve 33 thereon. The friction sleeve is rotated by a suitable knurled knob 34, the shaft 32 being journalled in a suitable bearing 35 at one end and being seated within a notch 36 formed in a leaf spring member 37 at the other end. The bearing 35 and spring 37 function to bias the shaft 32 against the stage back portion 30, the latter bearing against the cover plate 26. For a more thorough description of the stage drive mechanism disclosed herein, reference should be had to my copending application Ser. No. 244,692, filed Dec. 14, 1962, and now abandoned, where this structure is disclosed and claimed.

It is contemplated that changes and modifications may be made in the present invention without departing from the spirit or scope thereof.

What is claimed is:
1. In a stereomicroscope, the combination comprising a microscope stand,
 a pair of microscope tube assemblies focused on a point of a specimen, one of said pair being fixed and the other being arcuately movably mounted in said stand, the optical axes of both of said tube assemblies being disposed substantially in a common plane including said point whereby upon pivotal movement of said movable tube assembly about said point a relative adjustable spacing of said tube assemblies is provided,
 a support member for said movable assembly including a laterally extended portion whereon two widely separated coplanar flat contact surfaces are formed,
 a flat plate fixed in said stand parallel to said plane whereon said contact surfaces slidably rest so as to prevent transverse tilting of said support member,
 a ball element formed on the lower end of said support member in a position horizontally coaxial with said point,
 a ball socket formed on said stand facing said ball element and engaging with it,
 an elongated flat spring extending laterally across the front side of said support member and biased under spring stress thereagainst, said spring being located in an intermediate position between said element and said portion, and anchor means cooperatively formed on said stand and said spring for securing the spring under spring stress against said front side so that primarily the ball element is firmly seated in said socket and secondarily a frictional drag is applied to the pivotal motion of said support member.

2. A stereomicroscope comprising a microscope stand, a pair of microscope tube assemblies having individual axes which intersect at a focal point on a specimen surface to be examined, a pivotable support member on which one of said assemblies is mounted for arcuate motion, a ball element and a socket element confronting and operably engaged therewith, one of said elements being formed on the lower extremity of said support member in horizontal alignment with said point and the other element being formed on the inner wall of said stand to act as the sole pivoting means for said arcuate motion, a pair of widely separated coplanar and vertical flat rear surfaces formed on the upper part of said support member, a vertical flat plate secured in the upper part of said stand and having a smooth front surface whereon said flat surfaces slide so as to guide the upper end of the movable tube assembly, and an elongated flat spring anchored at its ends in said stand horizontally at an elevation intermediate between said flat surfaces and said ball element and bearing under spring stress against the front side of said support member in a direction such that simultaneously the flat surfaces are biased against said vertical flat plate while the ball and socket are maintained in contact with each other.

References Cited

UNITED STATES PATENTS

| | | | |
|---|---|---|---|
| 1,914,212 | 6/1933 | Ott | 88—39 |
| 2,942,519 | 6/1960 | Boughton et al. | 88—39 |
| 3,029,696 | 4/1962 | Schmidt | 88—39 X |

DAVID H. RUBIN, *Primary Examiner.*

J. M. GUNTHER, *Assistant Examiner.*